United States Patent [19]

Lee

[11] Patent Number: 5,704,653
[45] Date of Patent: Jan. 6, 1998

[54] SYSTEM FOR IDENTIFYING STARS, PLANETS, DEEP SKY OBJECTS AND CONSTELLATIONS

[75] Inventor: Samuel Lee, 11410 Deal Rd., North Fort Myers, Fla. 33917

[73] Assignees: Samuel Lee, Durango, Colo.; Al Lawrence, Wallkill, N.Y.; Timothy Brown, Durango, Colo.

[21] Appl. No.: 654,913

[22] Filed: May 29, 1996

[51] Int. Cl.⁶ .................................................. G09B 29/00
[52] U.S. Cl. ............................ 283/34; 434/284; 33/268
[58] Field of Search ........................... 283/34, 35, 117; 33/268, 271, 281; 434/284, 289

[56] References Cited

U.S. PATENT DOCUMENTS

| | | |
|---|---|---|
| 832,527 | 10/1906 | Barritt . |
| 2,231,071 | 2/1941 | Harvey . |
| 2,337,587 | 12/1943 | Brocky . |
| 2,432,958 | 12/1947 | Wenzel . |
| 2,495,211 | 1/1950 | Curtis ............................ 434/289 |
| 2,508,027 | 5/1950 | Hoffmeister . |
| 2,755,565 | 7/1956 | Alkema . |
| 3,003,258 | 10/1961 | Stefano ........................... 434/289 |
| 3,257,728 | 6/1966 | Blomquist . |
| 3,863,365 | 2/1975 | Moliand ........................... 434/289 |
| 3,863,665 | 2/1975 | Moliard . |
| 4,402,672 | 9/1983 | Lowe, Jr. ........................ 283/34 |
| 4,403,422 | 9/1983 | Sperling . |
| 4,938,697 | 7/1990 | Mayer . |
| 4,970,793 | 11/1990 | Atamian . |
| 5,419,586 | 5/1995 | Golson ........................... 283/34 |

*Primary Examiner*—Willmon Fridie, Jr.
*Attorney, Agent, or Firm*—Lucas & Just

[57] ABSTRACT

A system to help a viewer find stars, planets, deep sky objects and constellations is disclosed. The system has a series of sky maps showing different views of the sky. One or more tables is provided for each map. The tables assist in corresponding the sky map to the sky. The tables have coordinates corresponding to times and dates and inform the viewer as to the direction in which he should look, the way in which the sky map should be oriented and whether the viewer should look high in the sky, low in the sky or in-between.

13 Claims, 18 Drawing Sheets

| TOP TABLE | JAN 1 15 | FEB 1 15 | MAR 1 15 | APR 1 15 | MAY 1 15 | JUN 1 15 | JUL 1 15 | AUG 1 15 | SEP 1 15 | OCT 1 15 | NOV 1 15 | DEC 1 15 |
|---|---|---|---|---|---|---|---|---|---|---|---|---|
| 5–6PM | 8RM 8SM | | | | | | | | | | 8PM 8QM 8QM 8RM | 8PM 8QM 8QM 8RM 8RM |
| 6–7PM | 8SM 8SM 8AM 1AM | | | | | | | | | 8PM 8QM 8QM 8RM 8RM | 8QM 8QM 8RM 8RM 8SM | 8QM 8QM 8RM 8RM 8SM |
| 7–8PM | 8SM 8AM 1AM 1BM 1BM | | | | | | | | 8OM 8PM 8QM 8QM 8RM 8RM 8SM | 8PM 8QM 8QM 8RM 8RM 8SM 8SM | 8RM 8RM 8SM 8SM 8AM | 8RM 8SM 8SM 8AM |
| 8–9PM | 8AM 1AM 1BM 1BM 1CM | | | | | 8OH 8OM 8OM 8PM 8QM 8QM 8RM | 8OM 8OM 8PM 8QM 8QM 8RM 8RM | 8PM 8QM 8QM 8RM 8RM 8SM 8SM | 8QM 8RM 8RM 8SM 8SM 8AM 1AM | 8RM 8SM 8SM 8AM 1AM 1BM | 8SM 8AM 1AM 1BM 1BM | 8AM 1AM 1BM 1BM 1CM |
| 9–10PM | 1AM 1BM 1BM 1CM 1CM | 1CM 1CM | | | 1FM | 1FH 1GH 1JH 1JH 8JH 8NH 8OH | 8JH 8NH 8OH 8OM 8OM 8PM | 8OM 8PM 8QM 8QM 8RM 8RM 8SM | 8RM 8RM 8SM 8SM 8AM 1AM 1BM | 8SM 8AM 1AM 1BM 1BM 1CM | 1BM 1BM 1CM 1CM 1CM | 1BM 1CM 1CM 1CM 1DM |
| 10–11PM | 1BM 1BM 1CM 1CM 1DM | 1CM 1DM | 1DM 1DM | 1DM 1EM | 1EM 1FM | 1FH 1GH 1JH 1JH 8JH 8NH 8OH | 8NH 8OH 8OM 8OM 8PM 8QM 8QM | 8PM 8QM 8QM 8RM 8RM 8SM 8SM | 8SM 8AM 8AM 1AM 1BM 1BM 1CM | 1BM 1CM 1CM 1CM 1DM | 1CM 1CM 1DM 1DM | 1CM 1DM 1DM 1EM |
| 11–12PM | 1BM 1CM 1CM 1DM 1DM | 1DM 1DM | 1DM 1EM | 1EM 1FM | 1FM 1FH | 1GH 1JH 1JH 8JH 8NH 8OH 8OM | 8OH 8OM 8OM 8PM 8QM 8QM 8RM | 8QM 8RM 8RM 8SM 8SM 8AM 1AM | 8AM 1AM 1BM 1BM 1CM 1CM 1DM | 1CM 1DM 1DM 1DM 1EM | 1DM 1DM 1EM 1EM | 1DM 1EM 1EM 1FM |
| 12–1AM | 1CM 1CM 1DM 1DM 1EM | 1DM 1EM | 1EM 1FM | 1FM 1FH | 1FH 1GH | 1JH 1JH 8JH 8NH 8OH 8OM 8OM | 8OM 8PM 8PM 8QM 8QM 8RM 8RM | 8RM 8SM 8SM 8AM 1AM 1BM 1BM | 1BM 1CM 1CM 1DM 1DM 1EM 1EM | 1DM 1EM 1EM 1FM | 1EM 1FM 1FM 1FH | 1FM 1FM 1FH 1GH |
| 1–2AM | 1CM 1DM 1DM 1EM 1EM | 1EM 1EM | 1FM 1FM | 1FH 1FH | 1GH 1JH | 1JH 8JH 8NH 8OH 8OM 8OM 8PM | 8PM 8QM 8QM 8RM 8RM 8SM 8SM | 8SM 8AM 1AM 1BM 1BM 1CM 1CM | 1CM 1DM 1DM 1EM 1EM 1FM 1FM | 1EM 1FM 1FM 1FH | 1FH 1GH 1GH 1JH | 1GH 1JH 1JH 8JH |
| 2–3AM | 1DM 1DM 1EM 1EM 1FM | 1EM 1FM | 1FM 1FH | 1FH 1GH | 1JH 1JH | 8JH 8NH 8OH 8OM 8OM 8PM 8QM | 8QM 8QM 8RM 8RM 8SM 8SM 8AM | 8AM 1AM 1BM 1BM 1CM 1CM 1DM | 1DM 1EM 1EM 1FM 1FM 1FH 1FH | 1FM 1FH 1FH 1GH | 1GH 1JH 1JH 8JH | 1JH 8JH 8NH 8OH |
| 3–4AM | 1DM 1EM 1EM 1FM 1FM | 1FM 1FH | 1FH 1GH | 1GH 1JH | 1JH 8JH | 8NH 8OH 8OM 8OM 8PM 8QM 8QM | 8RM 8RM 8SM 8SM 8AM 1AM 1AM | 1AM 1BM 1BM 1CM 1CM 1DM 1DM | 1EM 1EM 1FM 1FM 1FH 1FH 1GH | 1FH 1GH 1GH 1JH | 1JH 8JH 8JH 8NH | 8JH 8NH 8OH 8OM |
| 4–5AM | 1EM 1EM 1FM 1FM 1FH | 1FH 1GH | 1GH 1JH | 1JH 8JH | 8JH 8NH | 8OH 8OH 8OM 8PM 8QM 8QM 8RM | 8RM 8SM 8SM 8AM 1AM 1BM 1BM | 1BM 1CM 1CM 1DM 1DM 1EM 1EM | 1FM 1FM 1FH 1FH 1GH 1JH 1JH | 1GH 1JH 1JH 8JH | 8JH 8NH 8NH 8OH | 8NH 8OH 8OM 8OM |
| 5–6AM | 1FM 1FM 1FH 1GH 1GH | 1GH 1JH | 1JH 8JH | 8JH 8NH | 8NH 8OH | 8OH 8OM 8PM 8QM 8QM 8RM 8RM | 8SM 8SM 8AM 1AM 1BM 1BM 1CM | 1CM 1DM 1DM 1EM 1EM 1FM 1FM | 1FH 1FH 1GH 1JH 1JH 8JH 8JH | 1JH 8JH 8JH 8NH | 8NH 8OH 8OH 8OM | 8OH 8OM 8OM 8PM |
| 6–7AM | 1FM 1FH 1FH 1GH 1JH | 1JH 8JH | 8JH 8NH | 8NH 8OH | 8OH 8OM | | | | | | | |
| 7–8AM | 1GH 1JH | | | | | | | | | | | 1FH |

Fig. 3A

| MIDDLE TABLE | JAN 1 | JAN 15 | FEB 1 | FEB 15 | MAR 1 | MAR 15 | APR 1 | APR 15 | MAY 1 | MAY 15 | JUN 1 | JUN 15 | JUL 1 | JUL 15 | AUG 1 | AUG 15 | SEP 1 | SEP 15 | OCT 1 | OCT 15 | NOV 1 | NOV 15 | DEC 1 | DEC 15 |
|---|---|---|---|---|---|---|---|---|---|---|---|---|---|---|---|---|---|---|---|---|---|---|---|---|
| 5-6PM | | | | | | | | | | | | | | | | | | | | | | | 8QM | 8QM |
| 6-7PM | 8SL | 8SL | 8AL | 1AL | | | | | | | | | | | | | | | 8PM | 8PM | 8QM | 8QM | 8RL | |
| 7-8PM | 8SL | 8AL | 1AL | 1AL | 1BL | 1BL | 1CL | | | | | | | | | | 8NM | 8OM | 8PM | 8PM | 8QM | 8QM | 8RL | 8SL |
| 8-9PM | 8AL | 1AL | 1BL | 1BL | 1BL | 1CL | 1DM | 1DM | | | | | | | | 8NM | 8OM | 8PM | 8PM | 8QM | 8QM | 8RL | 8SL | 8SL |
| 9-10PM | 1AL | 1BL | 1BL | 1CL | 1DM | 1DM | 1DM | 1EM | 1EM | | | | | | 8NM | 8NM | 8OM | 8PM | 8PM | 8QM | 8QM | 8RL | 8SL | 8SL |
| 10-11PM | 1BL | 1BL | 1CL | 1DM | 1DM | 1DM | 1EM | 1EM | 1FM | 1FM | | | | 8JH | 8NM | 8NM | 8OM | 8PM | 8PM | 8QM | 8QM | 8RL | 8SL | 8SL |
| 11-12PM | 1BL | 1CL | 1DM | 1DM | 1DM | 1EM | 1EM | 1FM | 1FM | 1GM | 1GM | | 1JH | 8JH | 8NM | 8NM | 8OM | 8PM | 8PM | 8QM | 8QM | 8RL | 8SL | 8AL |
| 12-1AM | 1CL | 1DM | 1DM | 1DM | 1EM | 1EM | 1FM | 1FM | 1GM | 1GM | 1GM | 1JH | 1JH | 8JH | 8NM | 8NM | 8OM | 8PM | 8PM | 8QM | 8QM | 8RL | 8SL | 8AL |
| 1-2AM | 1DM | 1DM | 1DM | 1EM | 1EM | 1FM | 1FM | 1GM | 1GM | 1GM | 1JH | 1JH | 8JH | 8NM | 8NM | 8OM | 8OM | 8PM | 8PM | 8QM | 8QM | 8RL | 8SL | 8AL |
| 2-3AM | 1DM | 1DM | 1EM | 1EM | 1EM | 1FM | 1GM | 1GM | 1GM | 1JH | 1JH | 8JH | 8NM | 8NM | 8NM | 8OM | 8PM | 8PM | 8QM | 8QM | 8RL | 8SL | 8SL | 8AL |
| 3-4AM | 1DM | 1EM | 1EM | 1EM | 1FM | 1GM | 1GM | 1GM | 1JH | 1JH | 8JH | 8NM | 8NM | 8NM | 8OM | 8OM | 8PM | 8QM | 8QM | 8RL | 8SL | 8SL | 8AL | 1AL |
| 4-5AM | 1EM | 1EM | 1EM | 1FM | 1GM | 1GM | 1GM | 1JH | 1JH | 8JH | 8NM | 8NM | 8NM | 8OM | 8OM | 8PM | 8QM | 8QM | 8RL | 8SL | 8SL | 8AL | 1AL | 1BL |
| 5-6AM | 1EM | 1FM | 1GM | 1GM | 1GM | 1JH | 1JH | 8JH | 8NM | 8NM | 8NM | 8OM | 8OM | 8PM | 8PM | 8QM | 8QM | 8RL | 8SL | 8SL | 8AL | 1AL | 1BL | 1BL |
| 6-7AM | 1FM | 1GM | 1GM | 1GM | 1JH | 1JH | 8JH | 8NM | 8NM | 8NM | 8OM | 8OM | 8PM | 8PM | 8QM | 8QM | 8RL | 8RS | 8SL | 8AL | 1AL | 1BL | 1BL | 1CL |

Fig. 3B

| BOTTOM TABLE | JAN 1 | JAN 15 | FEB 1 | FEB 15 | MAR 1 | MAR 15 | APR 1 | APR 15 | MAY 1 | MAY 15 | JUN 1 | JUN 15 | JUL 1 | JUL 15 | AUG 1 | AUG 15 | SEP 1 | SEP 15 | OCT 1 | OCT 15 | NOV 1 | NOV 15 | DEC 1 | DEC 15 |
|---|---|---|---|---|---|---|---|---|---|---|---|---|---|---|---|---|---|---|---|---|---|---|---|---|
| 6–7PM | 8RL | 8SL | 8AL | | | | | | | | | | | | | | | | | 8PM | 8PM | 8QL | 8QL | 8RL |
| 7–8PM | 8SL | 8AL | 1AL | 1BL | 1CL | 1CL | 1DL | 1DL | 1EM | | | | | | | | | 8NM | 8OM | 8PM | 8PM | 8QL | 8RL | 8RL |
| 8–9PM | 8AL | 1AL | 1BL | 1CL | 1CL | 1DL | 1DL | 1EM | 1EM | 1FM | 1GM | 1GM | 1JM | | 8JM | 8NM | 8NM | 8OM | 8PM | 8PM | 8QL | 8QL | 8RL | 8SL |
| 9–10PM | 1AL | 1BL | 1CL | 1CL | 1DL | 1DL | 1EM | 1EM | 1FM | 1GM | 1GM | 1JM | 8JM | 8NM | 8NM | 8NM | 8OM | 8PM | 8PM | 8QL | 8QL | 8RL | 8RL | 8SL |
| 10–11PM | 1BL | 1CL | 1CL | 1DL | 1DL | 1EM | 1EM | 1FM | 1GM | 1GM | 1JM | 8JM | 8NM | 8NM | 8OM | 8OM | 8PM | 8PM | 8QL | 8QL | 8RL | 8RL | 8SL | 8AL |
| 11–12PM | 1CL | 1CL | 1DL | 1DL | 1EM | 1EM | 1FM | 1GM | 1GM | 1JM | 8JM | 8NM | 8NM | 8OM | 8OM | 8PM | 8PM | 8QL | 8QL | 8RL | 8RL | 8SL | 8AL | 1AL |
| 12–1AM | 1CL | 1DL | 1DL | 1EM | 1EM | 1FM | 1GM | 1GM | 1JM | 8JM | 8NM | 8NM | 8OM | 8OM | 8PM | 8PM | 8QL | 8QL | 8RL | 8RL | 8SL | 8AL | 1AL | 1BL |
| 1–2AM | 1DL | 1DL | 1EM | 1EM | 1FM | 1GM | 1GM | 1JM | 8JM | 8NM | 8NM | 8OM | 8OM | 8PM | 8PM | 8QL | 8QL | 8RL | 8RL | 8SL | 8AL | 1AL | 1BL | 1CL |
| 2–3AM | 1DL | 1EM | 1EM | 1FM | 1GM | 1GM | 1JM | 8JM | 8NM | 8NM | 8OM | 8OM | 8PM | 8PM | 8QL | 8QL | 8RL | 8RL | 8SL | 8AL | 1AL | 1BL | 1CL | 1CL |
| 3–4AM | 1EM | 1EM | 1FM | 1GM | 1GM | 1JM | 8JM | 8NM | 8NM | 8OM | 8OM | 8PM | 8PM | 8QL | 8QL | 8RL | 8RL | 8SL | 8AL | 1AL | 1BL | 1CL | 1CL | 1DL |
| 4–5AM | 1EM | 1FM | 1GM | 1GM | 1JM | 8JM | 8NM | 8NM | 8OM | 8OM | 8PM | 8PM | 8QL | 8QL | 8RL | 8RL | 8SL | 8AL | 1AL | 1BL | 1CL | 1CL | 1DL | 1DL |
| 5–6AM | 1FM | 1GM | 1GM | 1JM | 8JM | 8NM | 8NM | | | | | | | | | | | 1BL | 1CL | 1CL | 1DL | 1DL | 1EM | 1EM |
| 6–7AM | 1GM | 1GM | 1JM | 8JM | 8NM | | | | | | | | | | | | | | | | | | | 1FM |

Fig. 3C

| TOP TABLE | JAN 1 | 15 | FEB 1 | 15 | MAR 1 | 15 | APR 1 | 15 | MAY 1 | 15 | JUN 1 | 15 | JUL 1 | 15 | AUG 1 | 15 | SEP 1 | 15 | OCT 1 | 15 | NOV 1 | 15 | DEC 1 | 15 |
|---|---|---|---|---|---|---|---|---|---|---|---|---|---|---|---|---|---|---|---|---|---|---|---|---|
| 5–6PM | 2CL | 3CL | | | | | | | | | | | | | | | | | | | | | | 2CL |
| 6–7PM | 3CL | 3CL | 3CL | 4CL | | | | | | | | | | | | | | | | | | 2CL | 2CL | |
| 7–8PM | 3CL | 3CL | 4CL | 4BL | 4BM 5SM 5SL | | | | | | | | | | | | | | | | 2CL | 2CL | 3CL | 3CL |
| 8–9PM | 3CL | 4CL | 4BL | 4BM | 5SM 5SL | 5RL | 6RL | 6RL | 6RL | | | | | | | | | | 2CL | 2CL | 3CL | 3CL | 3CL | 3CL |
| 9–10PM | 4CL | 4BL | 4BM | 5SM | 5SL | 5RL | 6RL | 6RL | 6RL | 7RL | | | | | | | 2CL | 2CL | 3CL | 3CL | 3CL | 3CL | 3CL | 4CL |
| 10–11PM | 4BL | 4BM | 5SM | 5SL | 5RL | 6RL | 6RL | 6RL | 6RL | 7RL | | | | | | | 2CL | 2CL | 3CL | 3CL | 3CL | 4CL | 4BL | 4BL |
| 11–12PM | 4BM | 5SM | 5SL | 5RL | 6RL | 6RL | 6RL | 6RL | 7RL | | | | | | 2CL | 2CL | 3CL | 3CL | 3CL | 4CL | 4BL | 4BM | 4BM | |
| 12–1AM | 5SM | 5SL | 5RL | 6RL | 6RL | 6RL | 6RL | 7RL | | | | | | | 2CL | 3CL | 3CL | 3CL | 4CL | 4BL | 4BM 5SM | 5SL | | |
| 1–2AM | 5SL | 5RL | 6RL | 6RL | 6RL | 6RL | 7RL | | | | | | | | 2CL | 3CL | 3CL | 4CL | 4BL | 4BM 5SM | 5SL | | | |
| 2–3AM | 5RL | 6RL | 6RL | 6RL | 6RL | 7RL | | | | | | | | | 3CL | 3CL | 4CL | 4BL | 4BM 5SM | 5SL | | | | |
| 3–4AM | 5RL | 6RL | 6RL | 6RL | 7RL | | | | | | | | | | | | | | 4BM 5SM | 5SL | 5RL | | | |
| 4–5AM | 6RL | 6RL | 6RL | 7RL | | | | | | | | | | | | | | | | | 5RL | 6RL | 6RL | |
| 5–6AM | 6RL | 6RL | 7RL | | | | | | | | | | | | | | | | | | | | | |
| 6–7AM | 6RL | 7RL | | | | | | | | | | | | | | | | | | | | | | |
| 7–8AM | 7RL | | | | | | | | | | | | | | | | | | | | | | | |

Fig. 6A

| MIDDLE TABLE | JAN 1 | 15 | FEB 1 | 15 | MAR 1 | 15 | APR 1 | 15 | MAY 1 | 15 | JUN 1 | 15 | JUL 1 | 15 | AUG 1 | 15 | SEP 1 | 15 | OCT 1 | 15 | NOV 1 | 15 | DEC 1 | 15 |
|---|---|---|---|---|---|---|---|---|---|---|---|---|---|---|---|---|---|---|---|---|---|---|---|---|
| 5–6PM | | | | | | | | | | | | | | | | | | | | | | | | |
| 6–7PM | 3DL | 3DL | 3DL | 4CM | | | | | | | | | | | | | | | | | | | | 2CL |
| 7–8PM | 3DL | 3DL | 4CM | 4CM | 4BM | 5SM | 5RM | 5RM | | | | | | | | | | | | | | 2CL | 3DL | 3DL |
| 8–9PM | 3DL | 4CM | 4CM | 4BM | 5SM | 5RM | 5RM | 6QL | 6QL | 6QL | | | | | | | | | | | 2CL | 3DL | 3DL | 3DL |
| 9–10PM | 4CM | 4CM | 4BM | 5SM | 5RM | 5RM | 6QL | 6QL | 6QL | 6QL | | | | | | | | | | 2CL | 3DL | 3DL | 3DL | 4CM |
| 10–11PM | 4CM | 4BM | 5SM | 5RM | 5RM | 6QL | 6QL | 6QL | 6QL | | | | | | | | | | 2CL | 3DL | 3DL | 3DL | 4CM | 4CM |
| 11–12PM | 4BM | 5SM | 5RM | 5RM | 6QL | 6QL | 6QL | 6QL | | | | | | | | | | 2CL | 3DL | 3DL | 3DL | 4CM | 4CM | 4BM |
| 12–1AM | 5SM | 5RM | 5RM | 6QL | 6QL | 6QL | 6QL | | | | | | | | | | 2CL | 3DL | 3DL | 3DL | 4CM | 4CM | 4BM | 5SM |
| 1–2AM | 5RM | 5RM | 6QL | 6QL | 6QL | 6QL | | | | | | | | | | 2CL | 3DL | 3DL | 3DL | 4CM | 4CM | 4BM | 5SM | 5RM |
| 2–3AM | 5RM | 6QL | 6QL | 6QL | 6QL | | | | | | | | | | 2CL | 3DL | 3DL | 3DL | 4CM | 4CM | 4BM | 5SM | 5RM | 5RM |
| 3–4AM | 6QL | 6QL | 6QL | 6QL | | | | | | | | | | 2CL | 3DL | 3DL | 3DL | 4CM | 4CM | 4BM | 5SM | 5RM | 5RM | 6QL |
| 4–5AM | 6QL | 6QL | 6QL | | | | | | | | | | 3DL | 3DL | 3DL | 4CM | 4CM | 4BM | 5SM | 5RM | 5RM | 6QL | | |
| 5–6AM | 6QL | | | | | | | | | | | | | | 4CM | 4BM | 5SM | 5RM | 5RM | 6QL | | | | |
| 6–7AM | | | | | | | | | | | | | | | | | | | | 6QL | 6QL | 6QL | | |

Fig. 6B

| BOTTOM TABLE | JAN 1 15 | FEB 1 15 | MAR 1 15 | APR 1 15 | MAY 1 15 | JUN 1 15 | JUL 1 15 | AUG 1 15 | SEP 1 15 | OCT 1 15 | NOV 1 15 | DEC 1 15 |
|---|---|---|---|---|---|---|---|---|---|---|---|---|
| 6–7PM | 3DL 3DL 3DL | | | | | | | | | | | 3DL |
| 7–8PM | 3DL 3DL | 3DL 3DM | 4CM 4BM | 5SM 5RM | 6QM 6QL | | | | | | | 3DL 3DL |
| 8–9PM | 3DL | 3DM 4CM | 4BM 5SM | 5RM 6QM | 6QL 6QL | 6QL | | | | | 3DL 3DL | 3DL 3DL |
| 9–10PM | 3DM | 4CM 4BM | 5SM 5RM | 6QM 6QL | 6QL 6QL | 6QL 6QL | | | | 3DL 3DL | 3DL 3DL | 3DL 3DL |
| 10–11PM | 4CM 4BM | 5SM 5RM | 6QM 6QL | 6QL 6QL | 6QL 6QL | 6QL | | | 3DL 3DL | 3DL 3DL | 3DL 3DL | 3DM |
| 11–12PM | 4BM 5SM | 5RM 6QM | 6QL 6QL | 6QL 6QL | 6QL 6QL | | | 3DL 3DL | 3DL 3DL | 3DL 3DM | 4CM | 4CM |
| 12–1AM | 5SM 5RM | 6QM 6QL | 6QL 6QL | 6QL 6QL | 6QL | | 3DL 3DL | 3DL 3DL | 3DL 3DM | 4CM 4BM | 4BM | |
| 1–2AM | 5RM 6QM | 6QL 6QL | 6QL 6QL | 6QL 6QL | | 3DL 3DL | 3DL 3DL | 3DL 3DM | 4CM 4BM | 5SM 5RM | | |
| 2–3AM | 6QM 6QL | 6QL 6QL | 6QL 6QL | 6QL | 3DL 3DL | 3DL 3DL | 3DL 3DM | 4CM 4BM | 5SM 5RM | 6QM | | |
| 3–4AM | 6QL 6QL | 6QL 6QL | 6QL | 3DL 3DL | 3DL 3DL | 3DL 3DM | 4CM 4BM | 5SM 5RM | 6QM 6QL | | | |
| 4–5AM | 6QL 6QL | 6QL | | | | | | | | | | |
| 5–6AM | 6QL 6QL | | | | | | | | 4CM 4BM | 5SM 5RM | 6QM 6QL | |
| 6–7AM | 6QL | | | | | | | | | | | 6QL |

Fig. 6C

| TOP TABLE | JAN 1 | 15 | FEB 1 | 15 | MAR 1 | 15 | APR 1 | 15 | MAY 1 | 15 | JUN 1 | 15 | JUL 1 | 15 | AUG 1 | 15 | SEP 1 | 15 | OCT 1 | 15 | NOV 1 | 15 | DEC 1 | 15 |
|---|---|---|---|---|---|---|---|---|---|---|---|---|---|---|---|---|---|---|---|---|---|---|---|---|
| 5–6PM | | | | | | | | | | | | | | | | | | | | | | | | |
| 6–7PM | | | | | | | | | | | | | | | | | | | | | | | | |
| 7–8PM | | | 3CL | 4CL | | | | | | | | | | | | | | | | | | | 3CL | |
| 8–9PM | 3CL | 4CL | 4CL | 4CL | 4BL | 4BL | 5SL | | | | | | | | | | | | | | | | 3CL | 4CL |
| 9–10PM | 4CL | 4CL | 4BL | 4BL | 5SL | 5SL | 5RL | 5RL | 6RL | 6RL | | | | | | | | | | | 3CL | 4CL | 4CL | 4CL |
| 10–11PM | 4CL | 4BL | 4BL | 5SL | 5SL | 5RL | 5RL | 6RL | 6RL | 6RL | | | | | | | | | 3CL | 4CL | 4CL | 4BL | 4BL | 4BL |
| 11–12PM | 4BL | 4BL | 5SL | 5SL | 5RL | 5RL | 5RL | 6RL | 6RL | 6RL | | | | | | | | | 3CL | 4CL | 4CL | 4BL | 4BL | 5SL |
| 12–1AM | 4BL | 5SL | 5SL | 5RL | 5RL | 6RL | 6RL | 6RL | 6RL | 6RL | | | | | | | 3CL | 4CL | 4CL | 4BL | 4BL | 5SL | 5SL | 5SL |
| 1–2AM | 5SL | 5SL | 5RL | 5RL | 6RL | 6RL | 6RL | 6RL | | | | | | | | | 3CL | 4CL | 4CL | 4BL | 4BL | 5SL | 5SL | 5RL |
| 2–3AM | 5SL | 5RL | 5RL | 6RL | 6RL | 6RL | 6RL | | | | | | | | | | 4CL | 4CL | 4BL | 4BL | 5SL | 5SL | 5RL | 5RL |
| 3–4AM | 5RL | 5RL | 6RL | 6RL | 6RL | 6RL | | | | | | | | | | | | 4BL | 4BL | 5SL | 5SL | 5RL | 5RL | 6RL |
| 4–5AM | 5RL | 6RL | 6RL | 6RL | 6RL | | | | | | | | | | | | | | | 5SL | 5RL | 5RL | 5RL | 6RL |
| 5–6AM | 6RL | 6RL | 6RL | | | | | | | | | | | | | | | | | | | | | 6RL |
| 6–7AM | 6RL | | | | | | | | | | | | | | | | | | | | | | | |
| 7–8AM | | | | | | | | | | | | | | | | | | | | | | | | |

Fig. 8A

| MIDDLE TABLE | JAN 1 | 15 | FEB 1 | 15 | MAR 1 | 15 | APR 1 | 15 | MAY 1 | 15 | JUN 1 | 15 | JUL 1 | 15 | AUG 1 | 15 | SEP 1 | 15 | OCT 1 | 15 | NOV 1 | 15 | DEC 1 | 15 |
|---|---|---|---|---|---|---|---|---|---|---|---|---|---|---|---|---|---|---|---|---|---|---|---|---|
| 5–6PM | | | | | | | | | | | | | | | | | | | | | | | | |
| 6–7PM | | | 3DL | 3DL | 4DL | | | | | | | | | | | | | | | | | | | 3DL |
| 7–8PM | 3DL | 3DL | 3DL | 4DL | 4CL | 4CL | 4AL | 5AL | 5RL | | | | | | | | | | | | | | 3DL | 3DL |
| 8–9PM | 3DL | 4DL | 4CL | 4CL | 4AL | 5AL | 5RL | 5RL | 5QL | | | | | | | | | | | | | 3DL | 3DL | 4DL |
| 9–10PM | 4DL | 4CL | 4CL | 4AL | 5AL | 5RL | 5RL | 5QL | 6QL | | | | | | | | | | | 3DL | 3DL | 4DL | 4CL | 4CL |
| 10–11PM | 4CL | 4AL | 4AL | 5AL | 5RL | 5RL | 5QL | 5QL | 6QL | | | | | | | | | 3DL | 3DL | 4DL | 4CL | 4CL | 4AL | 4AL |
| 11–12PM | 4CL | 4AL | 5AL | 5RL | 5RL | 5RL | 5QL | 6QL | 6QL | | | | | | | | 3DL | 3DL | 4DL | 4CL | 4CL | 4AL | 4AL | 5AL |
| 12–1AM | 4AL | 5AL | 5RL | 5RL | 5RL | 5QL | 5QL | 6QL | 6QL | | | | | | | 3DL | 3DL | 4DL | 4CL | 4CL | 4AL | 4AL | 5AL | 5RL |
| 1–2AM | 5AL | 5RL | 5RL | 5RL | 5QL | 5QL | 6QL | 6QL | | | | | | | 3DL | 3DL | 4DL | 4CL | 4CL | 4AL | 5AL | 5RL | 5RL | |
| 2–3AM | 5RL | 5RL | 5RL | 5QL | 5QL | 5QL | 6QL | | | | | | | | 3DL | 4DL | 4CL | 4CL | 4AL | 5AL | 5RL | 5RL | | |
| 3–4AM | 5RL | 5QL | 5QL | 5QL | 6QL | 6QL | | | | | | | | | 4CL | 4CL | 4AL | 5AL | 5RL | 5RL | 5QL | | | |
| 4–5AM | 5RL | 5QL | 5QL | 6QL | | | | | | | | | | | | | | | 5RL | 5QL | 6QL | | | |
| 5–6AM | 5QL | 6QL | | | | | | | | | | | | | | | | | | | | | | |
| 6–7AM | | | | | | | | | | | | | | | | | | | | | | | | |

Fig. 8B

| BOTTOM TABLE | JAN 1 | 15 | FEB 1 | 15 | MAR 1 | 15 | APR 1 | 15 | MAY 1 | 15 | JUN 1 | 15 | JUL 1 | 15 | AUG 1 | 15 | SEP 1 | 15 | OCT 1 | 15 | NOV 1 | 15 | DEC 1 | 15 |
|---|---|---|---|---|---|---|---|---|---|---|---|---|---|---|---|---|---|---|---|---|---|---|---|---|
| 6–7PM | 3DL | 3DL | 3DL | | | | | | | | | | | | | | | | | | | | | 3DL |
| 7–8PM | 3DL | 3DL | 3DL | 4DL | 4CL | 4BL | 5SL | 5RL | 5QL | | | | | | | | | | | | | | 3DL | 3DL |
| 8–9PM | 3DL | 3DL | 4DL | 4DL | 4CL | 4BL | 5SL | 5RL | 5QL | 5QL | | | | | | | | | | | 3DL | 3DL | 3DL | 3DL |
| 9–10PM | 4DL | 4DL | 4DL | 4CL | 4BL | 5SL | 5RL | 5QL | 5QL | 5QL | 6QL | | | | | | | | 3DL | 3DL | 3DL | 4DL | 4DL | 4DL |
| 10–11PM | 4DL | 4CL | 4CL | 4BL | 5SL | 5RL | 5QL | 5QL | 5QL | 6QL | 6QL | 6QL | | | | | | 3DL | 3DL | 3DL | 4DL | 4DL | 4DL | 4CL |
| 11–12PM | 4CL | 4BL | 4BL | 5SL | 5RL | 5QL | 5QL | 5QL | 6QL | 6QL | 6QL | 6QL | | | | | 3DL | 3DL | 3DL | 4DL | 4DL | 4DL | 4CL | 4BL |
| 12–1AM | 4BL | 5SL | 5SL | 5RL | 5QL | 5QL | 5QL | 6QL | 6QL | 6QL | 6QL | 6QL | | | | 3DL | 3DL | 3DL | 4DL | 4DL | 4CL | 4CL | 4BL | 5SL |
| 1–2AM | 5SL | 5RL | 5RL | 5QL | 5QL | 5QL | 6QL | 6QL | 6QL | 6QL | 6QL | | | | 3DL | 3DL | 3DL | 4DL | 4DL | 4CL | 4BL | 4BL | 5SL | 5RL |
| 2–3AM | 5RL | 5QL | 5QL | 5QL | 5QL | 6QL | 6QL | 6QL | 6QL | 6QL | | | | 3DL | 3DL | 3DL | 4DL | 4DL | 4CL | 4BL | 5SL | 5SL | 5RL | 5QL |
| 3–4AM | 5QL | 5QL | 5QL | 5QL | 6QL | 6QL | 6QL | 6QL | 6QL | | | | | 4DL | 4CL | 4BL | 5SL | 5RL | 5QL | | | | | |
| 4–5AM | 5QL | 6QL | 6QL | 6QL | 6QL | 6QL | 6QL | | | | | | | | | | | | | | | | | |
| 5–6AM | 6QL | 6QL | 6QL | | | | | | | | | | | | | | | | | | | | | |
| 6–7AM | 6QL | | | | | | | | | | | | | | | | | | | | | | | 6QL |

Fig. 8C

| 1999 | VENUS | MARS | JUPITER | SATURN |
|---|---|---|---|---|
| JAN | CAPRICORN | VIRGO | PISCES | PISCES |
| FEB | AQUARIUS PISCES | VIRGO | PISCES | PISCES |
| MAR | PISCES ARIES | VIRGO | PISCES | PISCES |
| APR | ARIES TAURUS | VIRGO | PISCES | PISCES |
| MAY | TAURUS GEMINI | VIRGO | PISCES | ARIES |
| JUN | GEMINI CANCER | VIRGO | PISCES | ARIES |
| JUL | LEO | VIRGO | PISCES | ARIES |
| AUG | LEO | LIBRA | PISCES | ARIES |
| SEP | LEO | SCORPIO | PISCES | ARIES |
| OCT | VIRGO | SCORPIO SAGITTARIUS | PISCES | ARIES |
| NOV | VIRGO | SAGITTARIUS CAPRICORN | PISCES | ARIES |
| DEC | VIRGO LIBRA | CAPRICORN | PISCES | ARIES |

Fig. 9A

| 2000 | VENUS | MARS | JUPITER | SATURN |
|---|---|---|---|---|
| JAN | SCORPIO SAGITTARIUS | CAPRICORN AQUARIUS | PISCES | ARIES |
| FEB | SAGITTARIUS CAPRICORN | PISCES | PISCES | ARIES |
| MAR | CAPRICORN AQUARIUS | PISCES | PISCES ARIES | ARIES |
| APR | PISCES | ARIES | ARIES | ARIES |
| MAY | ARIES | TAURUS | ARIES | ARIES |
| JUN | TAURUS GEMINI | TAURUS GEMINI | ARIES | ARIES |
| JUL | GEMINI CANCER | GEMINI | ARIES | TAURUS |
| AUG | LEO | CANCER | TAURUS | TAURUS |
| SEP | VIRGO | LEO | TAURUS | TAURUS |
| OCT | LIBRA SCORPIO | LEO | TAURUS | TAURUS |
| NOV | SCORPIO SAGITTARIUS | VIRGO | TAURUS | TAURUS |
| DEC | SAGITTARIUS CAPRICORN | VIRGO | TAURUS | TAURUS |

Fig. 9B

| 2001 | VENUS | MARS | JUPITER | SATURN |
|---|---|---|---|---|
| JAN | AQUARIUS PISCES | LIBRA | TAURUS | TAURUS |
| FEB | PISCES | LIBRA SCORPIO | TAURUS | TAURUS |
| MAR | PISCES | SCORPIO | TAURUS | TAURUS |
| APR | PISCES | SCORPIO | TAURUS | TAURUS |
| MAY | PISCES | SCORPIO | TAURUS | TAURUS |
| JUN | PISCES ARIES | SCORPIO | TAURUS | TAURUS |
| JUL | ARIES TAURUS | SCORPIO | TAURUS GEMINI | TAURUS |
| AUG | GEMINI | SCORPIO | GEMINI | TAURUS |
| SEP | CANCER LEO | SAGITTARIUS | GEMINI | TAURUS |
| OCT | LEO VIRGO | SAGITTARIUS CAPRICORN | GEMINI | TAURUS |
| NOV | VIRGO LIBRA | CAPRICORN | GEMINI | TAURUS |
| DEC | SCORPIO SAGITTARIUS | CAPRICORN AQUARIUS | GEMINI | TAURUS |

Fig. 9C

| 2002 | VENUS | MARS | JUPITER | SATURN |
|---|---|---|---|---|
| JAN | SAGITTARIUS CAPRICORN | AQUARIUS | GEMINI | TAURUS |
| FEB | CAPRICORN AQUARIUS | PISCES | GEMINI | TAURUS |
| MAR | PISCES | PISCES ARIES | GEMINI | TAURUS |
| APR | PISCES ARIES | ARIES TAURUS | GEMINI | TAURUS |
| MAY | TAURUS GEMINI | TAURUS | GEMINI | TAURUS |
| JUN | GEMINI CANCER | GEMINI | GEMINI | TAURUS |
| JUL | LEO | GEMINI CANCER | GEMINI | TAURUS |
| AUG | VIRGO | CANCER LEO | CANCER | TAURUS |
| SEP | VIRGO LIBRA | LEO | CANCER | TAURUS |
| OCT | LIBRA | LEO VIRGO | CANCER | TAURUS |
| NOV | LIBRA VIRGO | VIRGO | CANCER | TAURUS |
| DEC | VIRGO LIBRA | VIRGO LIBRA | CANCER | TAURUS |

Fig. 9D

SYSTEM FOR IDENTIFYING STARS, PLANETS, DEEP SKY OBJECTS AND CONSTELLATIONS

The present invention relates to the field of astronomy, and in particular, to a system making it easy for non-skilled persons to locate stars, notably constellations, and planets.

BACKGROUND OF THE INVENTION

Astronomers have been looking at stars since long before Galileo first used the telescope to view the heavens and, yet, are still finding new stars today. Many ordinary people also have an interest in looking at the stars, especially to try to find constellations. However, except by happenstance, ordinary people seldom see a constellation for which they are looking. The reason for this is that prior to the present invention there was never an easy system to use to locate stars and constellations. While there have been many patents issued on devices for finding constellations, none of them is simple to use.

SUMMARY OF THE INVENTION

The present invention makes it easy for even a novice to readily identify stars and constellations and to know when and where to look for them. It takes no more than a few minutes to learn how to use the invention, and it is so simple that even a child can readily learn it.

The invention is based on a series of maps which show the locations of stars and constellations, and a series of tables which tell how to orient the map, in what direction one should look and whether one should look high in the sky, low in the sky or in the middle. A device is also provided for orienting the person correctly when looking at the maps. A plurality of tables may be used with each map and there may be a geographic map for showing which table should be used depending on the geographic location of the individual.

BRIEF DESCRIPTION OF THE DRAWINGS

These and other features of the present invention may be more fully understood with reference to the drawings wherein:

FIG. 3 is a series of three tables with coordinates for using the map of FIG. 2;

FIG. 6 is a series of three tables with coordinates for using the map of FIG. 5;

FIG. 8 is a series of three tables with coordinates for using the map of FIG. 7; and FIG. 9 is a planet locator table.

DETAILED DESCRIPTION

Figure 1:
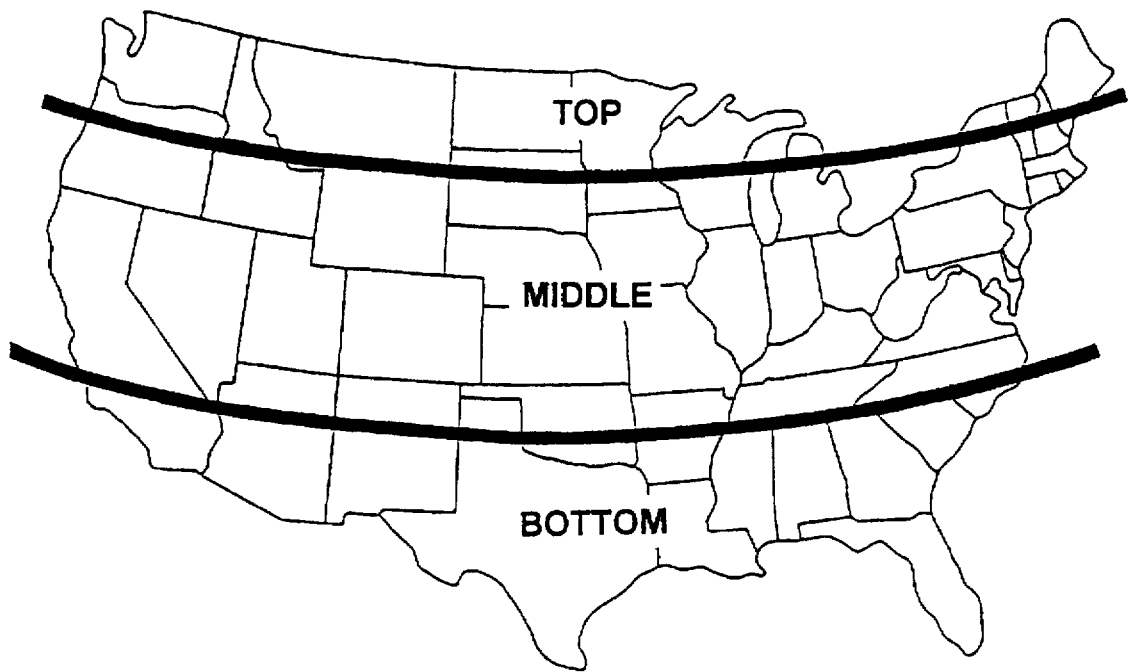
FIG. 1 is a geographical map for determining the latitudinal zone at which one should be looking.

FIG. 1 is a geographical map used in accordance with one aspect of the present invention. In the case of FIG. 1, the map is primarily of the United States. The map could, of course, be of any geographic area of the world. The map shown in FIG. 1 is divided into three sections: BOTTOM, MIDDLE and TOP. The geographical map is desirable in order to determine which of three tables (FIG. 3) is used in connection with the maps. The map of FIG. 1 need be used only once for each geographic location. For example, a person living in Omaha, Nebr. would always use the table marked MIDDLE (FIG. 3). While a geographical map is the preferred means for determining which table to use because of the ease of using a geographical map, it is also possible to use another means to determine whether to use the BOTTOM, MIDDLE or TOP table, e.g. a geographical index indicating the correct table for various cities. It is also within the scope of the invention to use an electronic locator which indicates BOTTOM, MIDDLE or TOP, or to use an 800 number, especially one that automatically identifies the table to use by the location of the telephone from which the call is placed. It is further within the scope of the invention, but not preferred, to have only one table associated with each sky map, thus eliminating the need for the geographic map.

Figure 2:
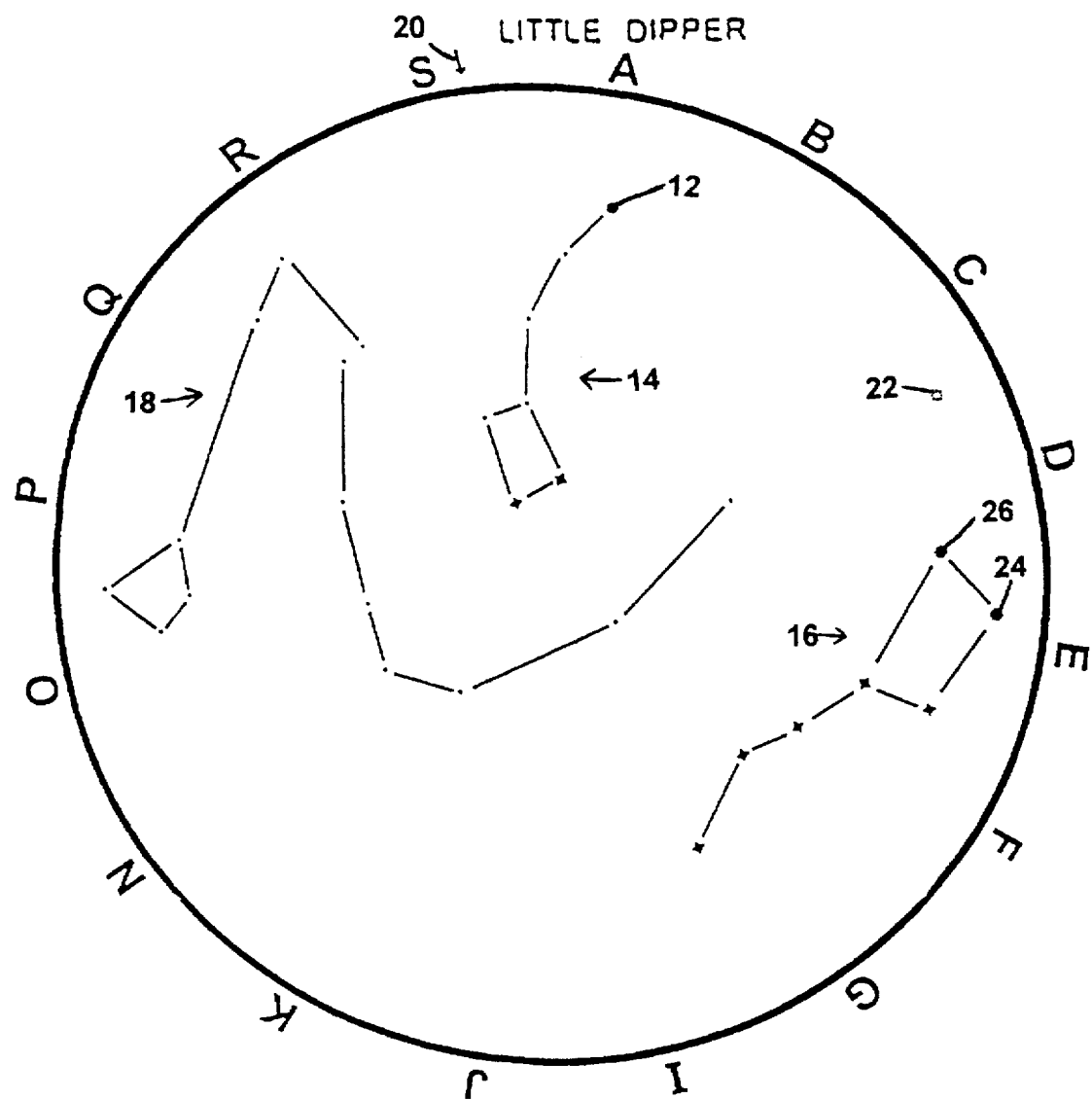
FIG. 2 is one map of the sky according to the present invention.
Figure 4:
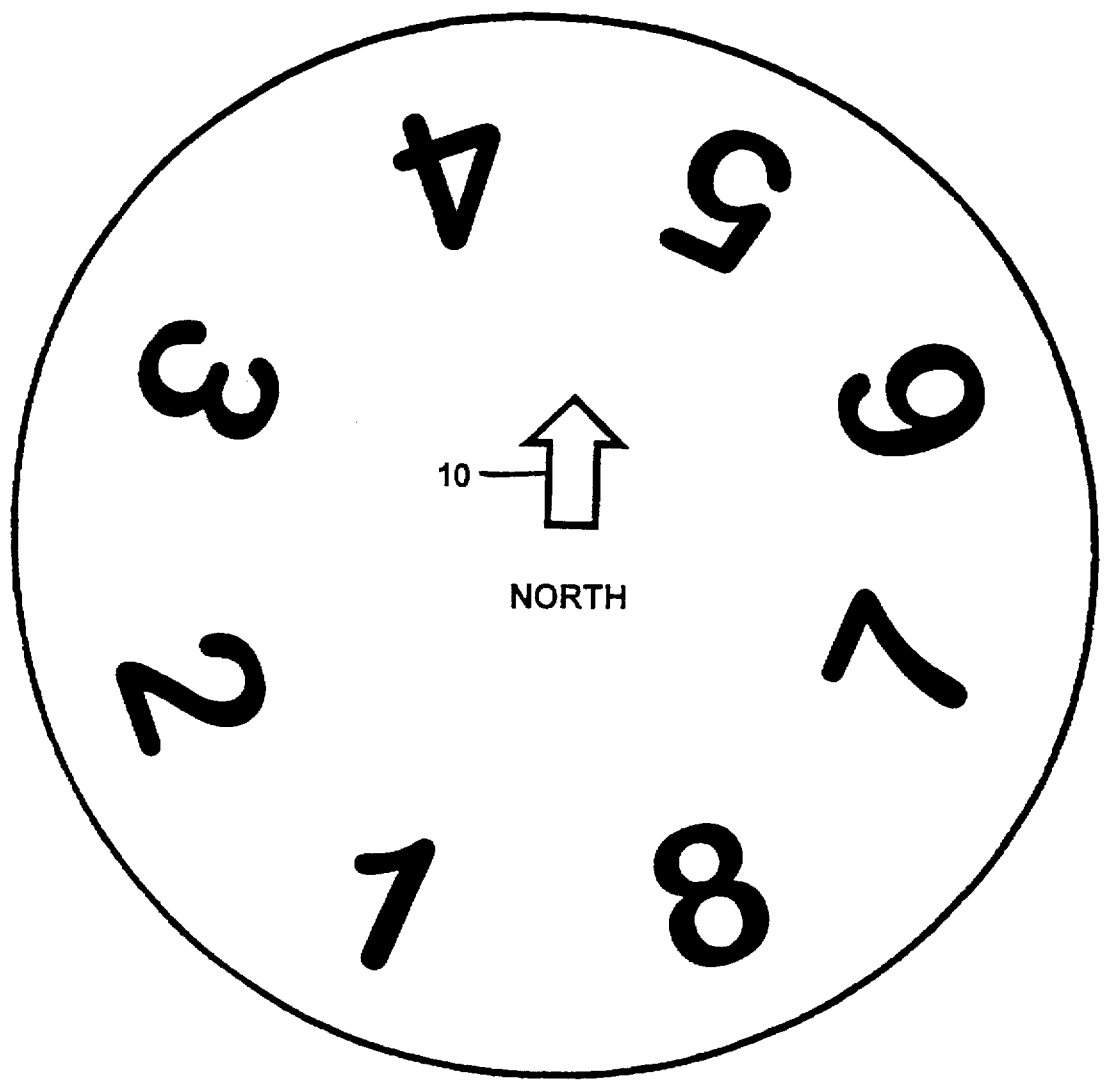
FIG. 4 is an azimuth disk for orienting the person to use the map.

FIG. 2 is a sky map showing stars and constellations and is used in conjunction with the coordinate tables shown in FIG. 3 and the azimuth disk shown in FIG. 4.

After determining whether to use the TOP, MIDDLE or BOTTOM table of FIG. 3 by determining geographic location such as with the geographical map of FIG. 1, the next step is to use the coordinate tables of FIG. 3. The coordinate tables, which are derived empirically, have dates as the X-axis and hours as the Y-axis. The embodiment shown in FIG. 3 shows hourly readings for time and bi-monthly readings for date. This is the preferred set-up. However, there could be more or less dates and more or less times. If the person from Omaha, Nebr. is standing outdoors at 11:30 p.m. on June 1, the table coordinates intersect at the three-character indicator 8JH. The first character, the "8," is used in conjunction with the azimuth disk of FIG. 4.

The azimuth disk has an indicator arrow 10 for North and the numerals "1" through "8" spaced evenly around the disk. The arrow 10 is aligned so that it points halfway between the "4" and the "5". The azimuth disk is either held in the hand or placed on the ground and aligned to the north. Most people know in which direction North is, and since exact precision is not required, a "guesstimate" is usually sufficient, at least to get started. An adjustment can be made to the azimuth disk after finding a particular constellation so that the azimuth disk points to true North. A compass can also be used for aligning the azimuth disk, and the azimuth disk can even have an inexpensive compass attached to it in place of arrow 10.

The first digit of the coordinate table of FIG. 3 is used to determine where one stands with respect to the azimuth disk. The person physically moves in accordance with the data in the table. In the hypothetical example of coordinates 8JH, the person from Omaha would align the azimuth disk towards North and then physically move himself until he was at position "8" of the azimuth disk.

The second coordinate in the table is J. FIG. 2 has letters A, B, C, D, E, etc. about the perimeter. The viewer, standing at position "8" with respect to the azimuth disk, rotates the sky map until coordinate J is pointing directly away from him. With the map of FIG. 2, the map would be upside down with respect to the viewer.

The final coordinate indicates whether, for this sky map, one should be looking low, medium or high in the sky. In this case, since the letter is H, one should be looking high. It has been found that holding the sky map comfortably in front of the viewer, pointing in the proper direction (in this case, J) and moving the sky map Low, Middle or High according to the particular coordinate given makes the finding of the stars and constellations shown in the sky map simplicity itself.

In the sky map of FIG. 2, one can see constellations Little Dipper 14, Big Dipper 16, and Draco 18. It has been found to be desirable to indicate these names on the sky map. In the case of FIG. 3, the name Little Dipper appears between the S and the A and an arrow 20 points to the Little Dipper 14. Similar indicators can be used for the other constellations and for other significant objects on the sky map, such as Polaris (the North Star) 12, Draco 18, the M-81 spiral galaxy 22, Merak 24 and Dubhe 26.

Figure 5:
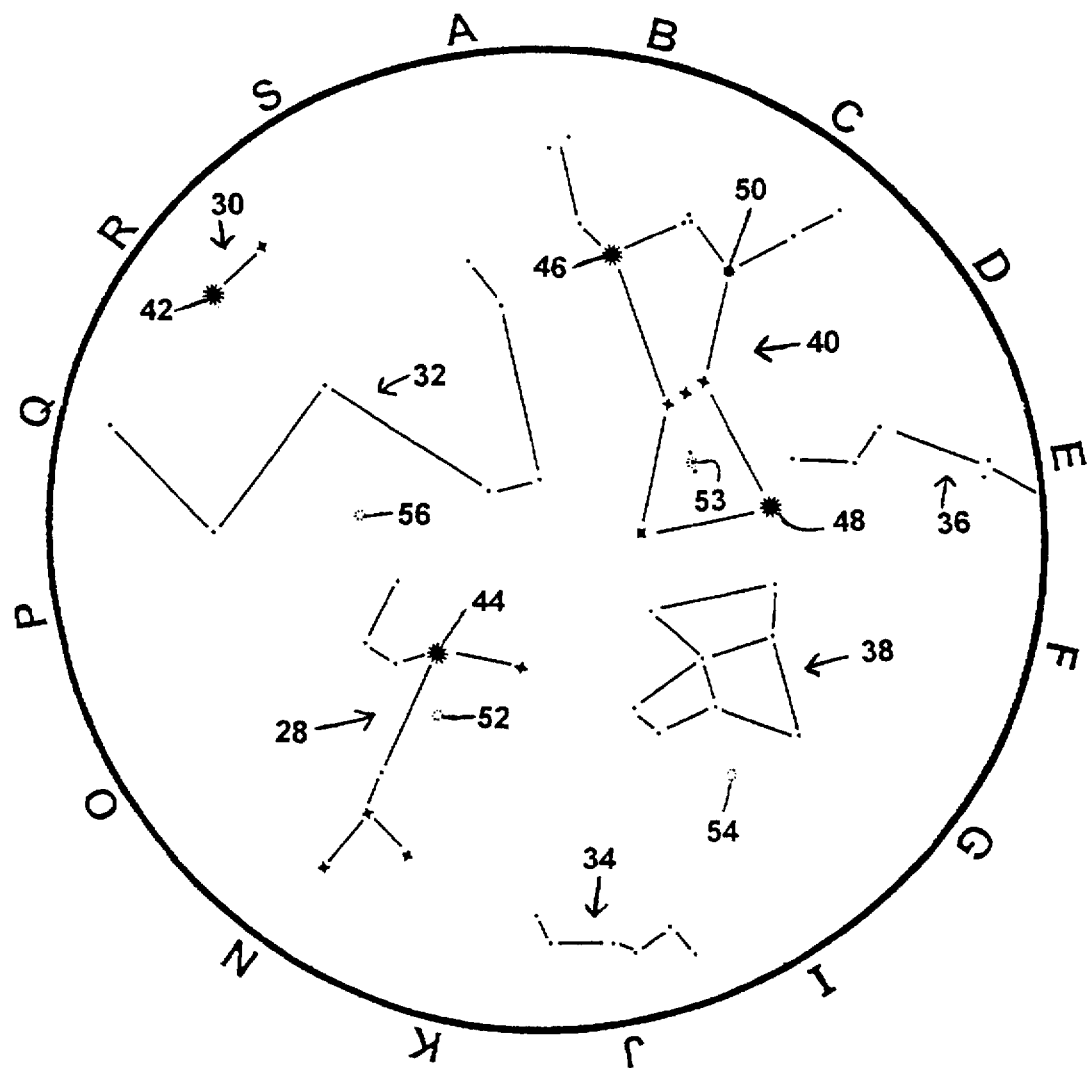
FIG. 5 is another map of the sky according to the present invention.
Figure 7:
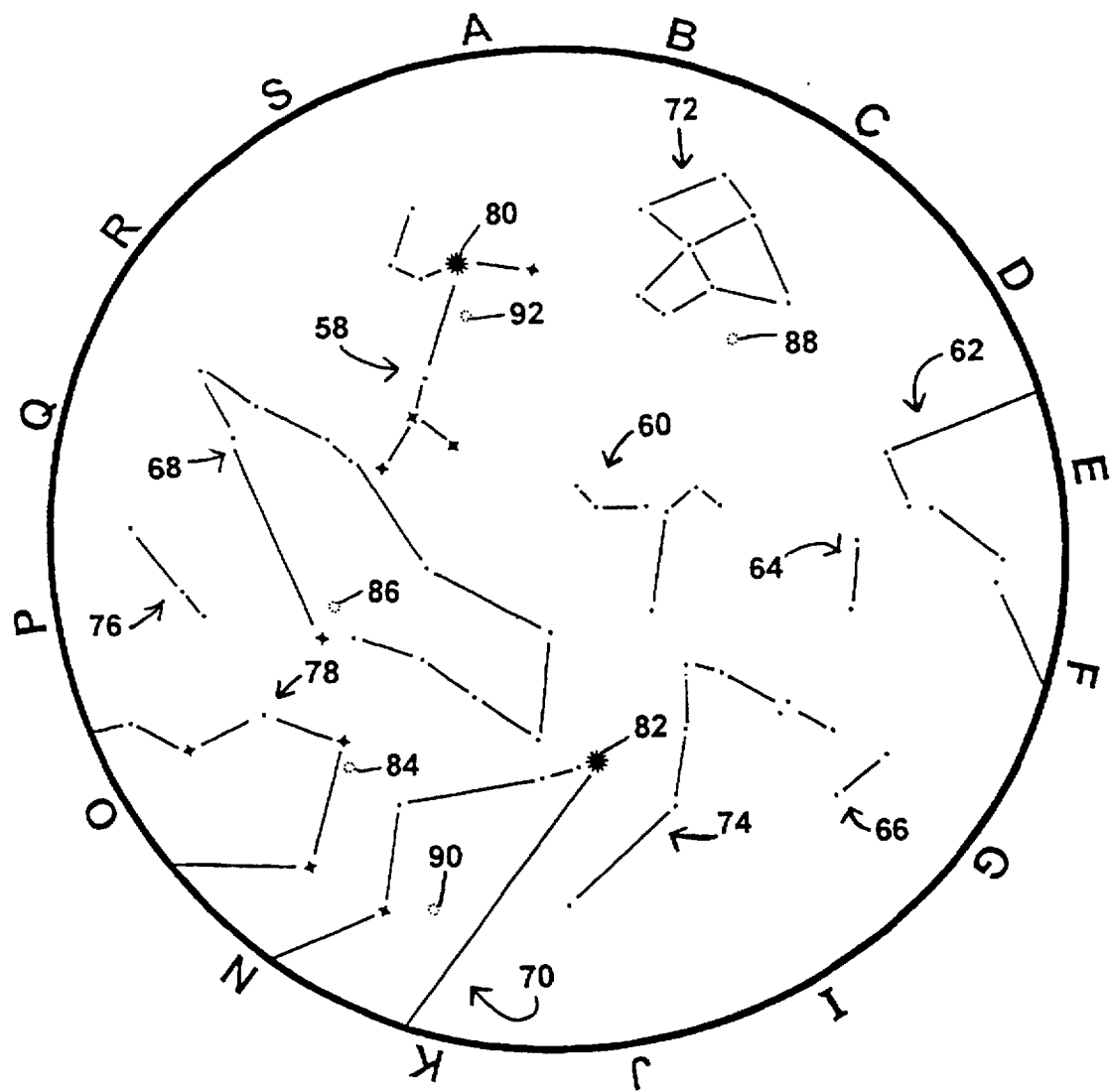
FIG. 7 is yet another map of the sky according to the present invention.

There is preferably a series of sky maps and tables so that the entire sky is covered throughout the year. Additional maps are shown in FIGS. 5 and 7 and their corresponding tables are shown in FIGS. 6 and 8. Referring to FIG. 5, one can see the constellations Canis Major 28, Canis Minor 30, Monoceros 32, Columba 34, Eridanus 36, Lepus 38 and Orion 40 as well as a number of bright stars 42, 44, 46, 48 and 50 and also a number of deep sky objects 52, 53, 54, and 56. In FIG. 7, there are the constellations Canis Major 58, Columba 60, Eridanus 62, Caelum 64, Dorado 66, Puppis 68, Carina 70, Lepus 72, Pictor 74, Pyxis 76 and Vela 78 as well as the bright stars Sirius 80 and Canopus 82. Five galactic clusters 84, 86, 88, 90 and 92 can also be seen.

Referring to FIGS. 3, 5 and 7, there are some intersections of columns and rows that do not have coordinates. This is either because at that time of day no stars are visible due to sunlight or because the stars of that particular sky map are not visible on that particular night from the geographical area shown in FIG. 1.

The planets of the solar system are also of interest to many people, especially the readily visible planets Venus, Mars, Jupiter and Saturn. Since all planets follow particular paths, astronomers know the constellation in or near which they will be appearing at a particular point in time. The coincidence of planets and constellations is so established that it is possible to create charts showing the constellations in or near which a particular planet will appear at a given point in time. FIG. 9 shows such a table for the years 1999-2002. As shown in FIG. 9, the visible planets are shown as the X-axis and the date is the Y-axis. The intersecting square shows the constellation in or near which a particular planet will be during a particular month. For example, in January of 2000 Jupiter will be located in or near the constellation Pisces. There are times when a planet is not in or near a constellation, but rather between two constellations. For example, in January of 2000 Venus will be between the constellations Scorpio and Sagittarius and this is so indicated in the table.

The table of FIG. 9 can be used in conjunction with the maps of FIGS. 2, 5 and 7 and the corresponding tables 3, 6 and 8 and with such additional maps and tables as one cares to make. As previously indicated, it has been found that a series of 20 maps is best suited for the United States. For ease of cross-reference, there can also be a table (not shown) indicating which map contains which constellations. This helps not only to find the constellations but also to find the planets.

It is preferred that the sky maps and tables be hard copies, e.g. one foot by one foot in plastic or on cardboard, the latter suitably being in a spiral bound notebook. However, the information could also be displayed electronically, such as with a lap top computer. It is also within the scope of the invention to have the tables entered into a pager-sized device in which the coordinates are displayed on a screen the size of those used on a pager. The only data the user would have to enter would be the date, time and table desired. It is also possible to use transparencies for the sky maps, either to hold them up for viewing through or for attachment to binoculars or a telescope.

Various other changes may be made for carrying out the instant invention without departing from the spirit and scope of the invention. It will therefore be understood that the claims are intended to cover all changes and modifications of the preferred embodiments of the invention herein chosen for the purpose of illustration which do not constitute a departure from the spirit and scope of the invention.

What is claimed is:

1. A system for aiding a viewer in the location of stars in the sky comprising:

(a) a series of sky maps showing different views of the sky, said sky maps having stars thereon and having means to enable a viewer to orient the sky map;

(b) a series of tables, at least one table being associated with each map, each said table having coordinates corresponding to times and dates, said coordinates being:

(i) a first coordinate indicating the direction in which a viewer should look;

(ii) a second coordinate indicating the orientation in which the sky map should be positioned; and (iii) a third coordinate indicating whether the viewer should look high, middle or low in the sky.

2. The system of claim 1 wherein there is a plurality of tables associated with each map, each said table being for a different latitudinal zone.

3. The system of claim 2 further including geographic means indicating which of the said plurality of tables the viewer should use for the viewer's geographic location.

4. The system of claim 3 wherein said geographic means is a map.

5. The system of claim 3 wherein the map is divided into latitudinal zones.

6. The system of claim 3 wherein said means is an electronic locator.

7. The system of claim 1 further including orientation means for use in conjunction with said first coordinate.

8. The system of claim 7 wherein said orientation means is an azimuth disk having indicia thereon about the circumference and having an indicator pointing North.

9. The system of claim 8 wherein said indicia are the numerals "1" through "8" equally spaced about said azimuth disk.

10. The system of claim 8 wherein said indicator pointing to North is an arrow.

11. The system of claim 8 wherein said indicator pointing to North is a compass.

12. The system of claim 1 further including planet locating means for determining the location of at least one planet on a sky map.

13. The system of claim 12 wherein said planet locating means is a table having planets as the X-axis and dates as the Y-axis.

* * * * *

UNITED STATES PATENT AND TRADEMARK OFFICE
CERTIFICATE OF CORRECTION

PATENT NO. : 5,704,653
DATED : January 6, 1998
INVENTOR(S) : Samuel Lee et al.

It is certified that error appears in the above-indentified patent and that said Letters Patent is hereby corrected as shown below:

Column 1, line 48, change "FIG. 3 is " to --Figs. 3A-3C are--; line 55, change "FIG. 6 is" to --Figs. 6A-6C are--; line 59, change "FIG. 8 is" to --Figs. 8A-8C are; line 61, delete the entire sentence and substitute therefor --Figs. 9A-9D are planet locator tables--.

Column 2, line 4, change "(FIG. 3)" to --(Figs. 3A-3C)--; line 8, change "3" to --3B--; line 24, change "FIG. 3" to --Figs. 3A-3C--; line 26, change "FIG. 3" to --Figs. 3A-3C--; line 28, change "FIG. 3" to --Figs. 3A-3C--; line 31, change "FIG. 3" to --Figs. 3A-3C--; line 52, change "FIG. 3" to --Fig. 3A, 3B or 3C--.

Column 3, line 9, change "3" to --2--; line 18, change "6" to --6A-6C--; and change "8" to --8A-8C--; line 28, change "3, 5 and 7" to --3A-3C, 6A-6C and 8A-8C--; line 43, change "FIG. 9 shows" to --Figs. 9A-9D show--; line 43, after "for" insert --each of--; line 44, change "FIG. 9" to --Figs. 9A-9D--; line 53, after "table" insert --of Fig. 9B--; line 54, change "table of FIG. 9" to --tables of Figs. 9A-9D--; line 55, change "3, 6" to --3A-3C, 6A-6C--; line 56, change "8" to --8A-8C--.

Signed and Sealed this

Twenty-eighth Day of April, 1998

*Attest:*

*Attesting Officer*

BRUCE LEHMAN

Commissioner of Patents and Trademarks